United States Patent
Bacarella et al.

(10) Patent No.: US 10,425,540 B2
(45) Date of Patent: Sep. 24, 2019

(54) METHOD AND SYSTEM FOR INTEGRATED OPTICAL SYSTEMS

(71) Applicant: DRS Network & Imaging Systems, LLC, Melbourne, FL (US)

(72) Inventors: Antonio Vernon Bacarella, Melbourne, FL (US); Kenneth Pietrasik, Melbourne, FL (US); Brian Backer, Melbourne, FL (US); Jon Piatt, Melbourne, FL (US)

(73) Assignee: DRS NETWORK & IMAGING SYSTEMS, LLC, Melbourne, FL (US)

( * ) Notice: Subject to any disclaimer, the term of this patent is extended or adjusted under 35 U.S.C. 154(b) by 0 days.

(21) Appl. No.: 16/113,889

(22) Filed: Aug. 27, 2018

(65) Prior Publication Data

US 2019/0014225 A1    Jan. 10, 2019

Related U.S. Application Data

(62) Division of application No. 14/542,368, filed on Nov. 14, 2014, now Pat. No. 10,104,241.

(Continued)

(51) Int. Cl.
*F41G 3/00* (2006.01)
*F41G 3/16* (2006.01)
(Continued)

(52) U.S. Cl.
CPC ..... *H04N 1/00095* (2013.01); *H04N 1/00347* (2013.01); *H04N 5/23203* (2013.01);
(Continued)

(58) Field of Classification Search
CPC . F41G 11/00; F41G 1/473; F41G 1/46; F41G 3/165; F41G 1/38; F41G 3/06;
(Continued)

(56) References Cited

U.S. PATENT DOCUMENTS

| | | | |
|---|---|---|---|
| 7,787,012 B2* | 8/2010 | Scales | A63F 13/10 348/158 |
| 8,336,777 B1* | 12/2012 | Pantuso | G02B 27/017 235/404 |

(Continued)

OTHER PUBLICATIONS

U.S. Appl. No. 14/542,368, "Restriction Requirement", dated Sep. 26, 2016, 7 pages.

(Continued)

*Primary Examiner* — Nathnael Aynalem
(74) *Attorney, Agent, or Firm* — Kilpatrick Townsend & Stockton LLP

(57) ABSTRACT

A method of operating optical systems includes forming a stitched image of a field of regard using a first optical device. The stitched image of the field of regard comprises a plurality of sub-images associated with a first field of view. The method also includes receiving an image of a second field of view from a second optical device and determining a location of the image of the second field of view in the stitched image. The method further includes communicating an indicator to the second optical device. The indicator is to the location of the image of the second field of view in the stitched image.

12 Claims, 9 Drawing Sheets

Related U.S. Application Data

(60) Provisional application No. 61/904,407, filed on Nov. 14, 2013.

(51) Int. Cl.
  *H04N 1/00* (2006.01)
  *H04N 5/33* (2006.01)
  *H04N 5/232* (2006.01)
  *H04N 5/77* (2006.01)

(52) U.S. Cl.
  CPC ........... *H04N 5/23293* (2013.01); *H04N 5/33* (2013.01); *H04N 5/23238* (2013.01); *H04N 5/77* (2013.01)

(58) Field of Classification Search
  CPC ... F41G 3/16; F41G 3/326; F41G 3/02; F41G 5/24; F41G 11/001; F41G 11/003; F41G 1/00; F41G 1/30; F41G 1/32; F41G 3/04; F41G 3/142; G01P 5/001; G02B 2027/0187; G02B 27/0189; G02B 2027/0138; G02B 27/014; G02B 27/01; G02B 27/017; A63F 13/10; A63F 13/53; A63F 13/837; A63F 2300/1012; A63F 2300/1062; A63F 2300/1087; A63F 2300/66; A63F 2300/8076; H04N 5/23254; H04N 5/23277; H04N 5/23293; H04N 5/145
  See application file for complete search history.

(56) References Cited

U.S. PATENT DOCUMENTS

| | | | |
|---|---|---|---|
| 9,151,572 B1* | 10/2015 | Sieracki | F41G 3/18 |
| 9,217,866 B2* | 12/2015 | Scales | F41G 3/165 |
| 2005/0041123 A1 | 2/2005 | Ansari et al. | |
| 2006/0268128 A1 | 11/2006 | Miwa et al. | |
| 2006/0268129 A1 | 11/2006 | Deng et al. | |
| 2008/0143842 A1 | 6/2008 | Gillard et al. | |
| 2008/0204361 A1* | 8/2008 | Scales | F41G 3/165 345/8 |
| 2009/0284582 A1 | 11/2009 | Mei et al. | |
| 2012/0182417 A1* | 7/2012 | Everett | F41G 1/30 348/135 |
| 2013/0286239 A1* | 10/2013 | Lupher | F41G 3/06 348/222.1 |
| 2015/0130950 A1 | 5/2015 | Bacarella et al. | |

OTHER PUBLICATIONS

U.S. Appl. No. 14/542,368 , "Non-Final Office Action", dated Nov. 1, 2016, 11 pages.
U.S. Appl. No. 14/542,368 , "Non-Final Office Action", dated May 22, 2017, 11 pages.
U.S. Appl. No. 14/542,368 , "Final Office Action", dated Nov. 21, 2017, 13 pages.
U.S. Appl. No. 14/542,368 , "Notice of Allowance", dated May 17, 2018, 12 pages.

* cited by examiner

METHOD AND SYSTEM FOR INTEGRATED OPTICAL SYSTEMS

CROSS-REFERENCES TO RELATED APPLICATIONS

This application is a divisional of U.S. patent application Ser. No. 14/542,368, filed on Nov. 14, 2014, which claims priority to U.S. Provisional Patent Application No. 61/904,407, filed on Nov. 14, 2013, entitled "Method and System for Integrated Optical Systems," the disclosures of which are hereby incorporated by reference in their entirety for all purposes.

SUMMARY OF THE INVENTION

The present invention relates generally to optical systems. Merely by way of example, the methods, systems, and apparatuses described herein have been applied to the integration of two optical systems. In a particular embodiment, a first optical system (e.g., a multi-spectral spotter scope) communicates with a second optical system (e.g., a rifle scope) to provide for a two-way communication flow between devices. The invention has wide applicability to still image and video data and the delivery thereof.

According to embodiments of the present invention, two optical systems, for example, including imaging devices, are utilized in an integrated manner. The first optical system images a portion of a scene that includes, for example, a structure, an area including structures, or other suitable viewable area. The optical systems are characterized by a field of view that is smaller than the viewable area, which can be referred to as a field of regard. The field of views may be different. Because each optical system images less than the viewable area, the two optical systems may be imaging a scene, but different portions of the scene that do not share an overlap region. Embodiments of the present invention enable the optical systems to be adjusted in order to share an overlap region.

In an embodiment, the first optical system is utilized to image the viewable area, the motion of the optical system is utilized along with images collected by the optical system to stitch together the viewable area from images of the subsets of the viewable area. The image of the viewable area can be stored in memory. Particular features in the viewable area can be marked by the first optical system, for example, landmarks, buildings, intersections of roads, and the like.

The second optical system is then used to image a subset of the viewable area. The image of the subset is utilized to determine a location in the viewable area associated with the subset imaged by the second optical system. Given the location, information can be provided to the second optical system to enable the operator to adjust the field of view of the second optical system to align with, for example, overlap with, the field of view of the first optical system.

According to an embodiment of the present invention, a method of operating optical systems is provided. The method includes forming a stitched image of a field of regard using a first optical device. The stitched image of the field of regard comprises a plurality of sub-images associated with a first field of view. The method also includes receiving an image of a second field of view from a second optical device and determining a location of the image of the second field of view in the stitched image. The method further includes communicating an indicator to the second optical device. The indicator is related to the location of the image of the second field of view in the stitched image.

According to another embodiment of the present invention, a method of aligning an optical system is provided. The method includes receiving a plurality of images at an integrated optical system. Each of the plurality of images is disposed in a field of regard. One of the plurality of images comprises a target image. The method also includes forming a stitched image of the field of regard using the plurality of images. The stitched image includes the target image. The method further includes receiving, at the integrated optical device, from the optical device, an image defined by a second field of view and correlating the image to the stitched image. Additionally, the method include transmitting information related to the correlation to the optical device, receiving, at the integrated optical device, from the optical device, a second image defined by the second field of view, and determining that at least a portion of the second image overlaps with at least a portion of the target image.

According to a specific embodiment of the present invention, a set of cooperative optical systems are provided. The set of cooperative optical systems include an integrated optical system that includes an infrared imaging system including an infrared detector, a laser range finder module, a power source, and a processor coupled to the infrared imaging system and the laser range finder module. The integrated optical system also includes a first wireless communications module, a first display module, a location module, and a visible imaging system. The set of cooperative optical systems also includes a second optical system that includes a second infrared imaging system, a second wireless communications module operable to communicate with the first wireless communications module, and a second display module.

Numerous benefits are achieved by way of these techniques over conventional methods. Benefits provided by the present invention include faster acquisition time, confirmation of targets and shared shooting solution between sniper and spotter. The Sniper Spotter relationship is enhanced by using inertial motion sensor units that sense when their fields of regard are matching and then provides image correlation. When the fields of regard do not overlap, there are indicators in both optical systems in some embodiments that point the direction each system would need to look to see the others image. If the Spotter calls out a target, the Sniper would then follow the arrow or other indicator to match or fall within the Spotter field of regard.

These and other details of embodiments along with many of their advantages and features are described in the following description, claims, and figures.

DETAILED DESCRIPTION OF SPECIFIC EMBODIMENTS

Embodiments of the present invention provide a Multi-Spectral Spotter Scope that is Integrated Night Observation Device (INOD) Compatible. Embodiments of the present invention provide an Integrated Remote Targeting and Sensing system that will augment sniper teams operational capabilities. The system provides positive confirmation and handoff of targets to sniper/spotter teams by providing a covert ultra wideband (UWB) wireless link between thermal sniper scopes such as Integrated Night Observation Device (INOD) and a spotter augmentation sight to demonstrate a path to improved target handoff and confirmation. Some embodiments use a UWB wireless link for covert wireless transfer of imagery and data in a closed cell implementation to facilitate the use of Rapid Targeting Acquisition (RTA) technology. Other embodiments utilize wired links or combinations of wired and wireless technology.

Although some embodiments of the present invention are discussed in terms of sniper-spotter applications, the present invention has much wider applicability and the systems and techniques discussed herein are also applicable in other technology areas. As examples, commercial implementations include surveying, building characterization and repair, and the like. As examples, in a surveying application, as points of interest are marked, a virtual map of the scene can be constructed, including coordinate positions, elevations, and the like of the points of interest and other features that are visible in the scene. This virtual map can then be shared with other imaging systems, enabling the imaging systems to find and image the points of interest. Thus, construction workers or others who image the scene can be provided with the virtual map, enabling imaging of the points of interest with assistance in locating the points of interest using the indicators provided by the system.

Thus, embodiments of the present invention are not limited to defense applications, but provides methods and systems suitable for use with a set of imaging devices. The first imaging device can augment the stitched image of the field of regard and then share data with the second imaging device to facilitate alignment between the set of imaging devices.

Figure 1:
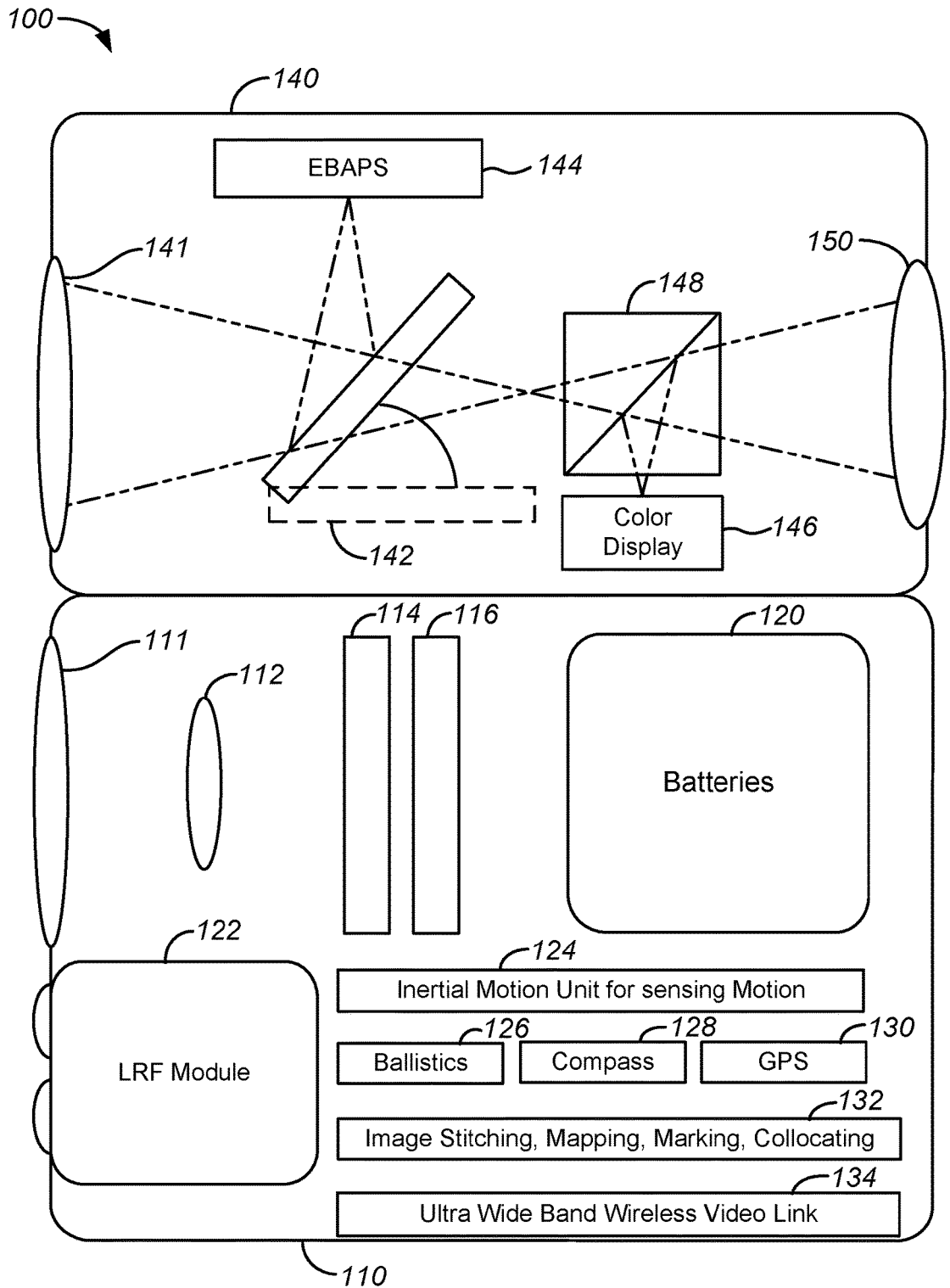
FIG. 1 is a simplified block diagram illustrating components of an integrated optical system according to an embodiment of the present invention.

FIG. 1 is a simplified block diagram illustrating components of an integrated optical system according to an embodiment of the present invention. As described below, the integrated optical system, which can be referred to as a Spotter scope, includes system components including technologies/products that are leveraged to provide the functionality of both a Sniper/Spotter matched field of regard guidance tool as well as a high resolution night vision optical system/Spotter scope.

The integrated optical system 100 includes an infrared/ranging module 110, which includes thermal imaging components as well as a laser range finder module 122. The integrated optical system 100 also includes a display module 140 that displays images produced using the infrared thermal imaging components or low light level visible radiation.

Referring to FIG. 1, the infrared/ranging module 110 includes a window 111 that receives infrared radiation, which is focused using infrared optical element 112, which may include a multi-element infrared lens. A long-wave infrared (LWIR) sensor 114, operating, for example, at 10 μm and which can have a pixel resolution of 1280×1024 pixels is utilized to image the incoming infrared light. Thermal imaging module 116 is used to process the data produced by the sensor 114. Batteries 120 are provided to power the integrated optical system although other power sources can be utilized. One of ordinary skill in the art would recognize many variations, modifications, and alternatives.

The system also includes a laser range finder (LRF) 122. As an example, the LRF can utilize an erbium-based laser operating at 1.55 μm with a range of 2 km, 3 km, 3.5 km, 4 km, or more. The infrared/ranging module also includes an inertial motion unit that is operable to sense motion of the integrated optical system with respect to a frame of reference and can be used to determine when a new frame of data is captured for image stitching. As described more fully below, this motion sensing capability enables the tracking of the motion of the integrated optical system as it is swept across a field of view. Other sub-systems useful in ranging and firing applications are provided, including a ballistics module 126, a compass 128, and a GPS unit 130. As individual images are obtained by the LWIR sensor, an imaging stitching, mapping, marking, and collocating unit 132 is utilized to stitch together the individual images into a larger image. Additional description related to image stitching is provided in relation to FIG. 4 below. The imaging stitching, mapping, marking, and collocating unit can include memory that can store the stitched image for future use by either the integrated optical system other optical devices. As an example, in addition to using the stitched image in the integrated optical system, the stitched image could be transmitted to a central data store for subsequent use by other optical systems imaging the field of regard.

In order to provide communications capability between the integrated optical system and a second optical system, a ultra-wide band wireless video link 134 is utilized in the embodiment illustrated in FIG. 1. In some embodiments, the ultra-wide band wireless video link is compliant with Low Probability of Intercept/Low Probability of Detection (LPI/LPD) standards, providing covertness for the system.

The integrated optical system also includes a display module 140. The display module includes a housing supporting an entrance window 141 and an exit window 150. The entrance and exit windows can incorporate optical elements that enable visible imaging of a scene by a user looking into the exit window. Flip mirror 142 can be utilized to direct the incoming light to impinge on an electron bombarded active pixel sensor (EBAPS) 144. The image obtained using this sensor is then displayed using a color display 146, which can be an SXGA color display, a 1.75 μm pixel pitch color CMOS display, or other suitable color display. The image produced by the color display is reflected in beam splitter 148 in order to pass through the exit window 150 for viewing by the user. In some implementations, the display module provides HD resolution at visible wavelengths. In addition to images obtained using the EBAPS 144, thermal images from the thermal imaging module 116 can be displayed for the user using the color display 146.

Thus, the integrated optical system provides the user with both visible and infrared imaging capabilities. Using embodiments of the present invention, the visible and infrared imagery can be overlaid using the system's display capabilities. One of ordinary skill in the art would recognize many variations, modifications, and alternatives.

Figure 2:
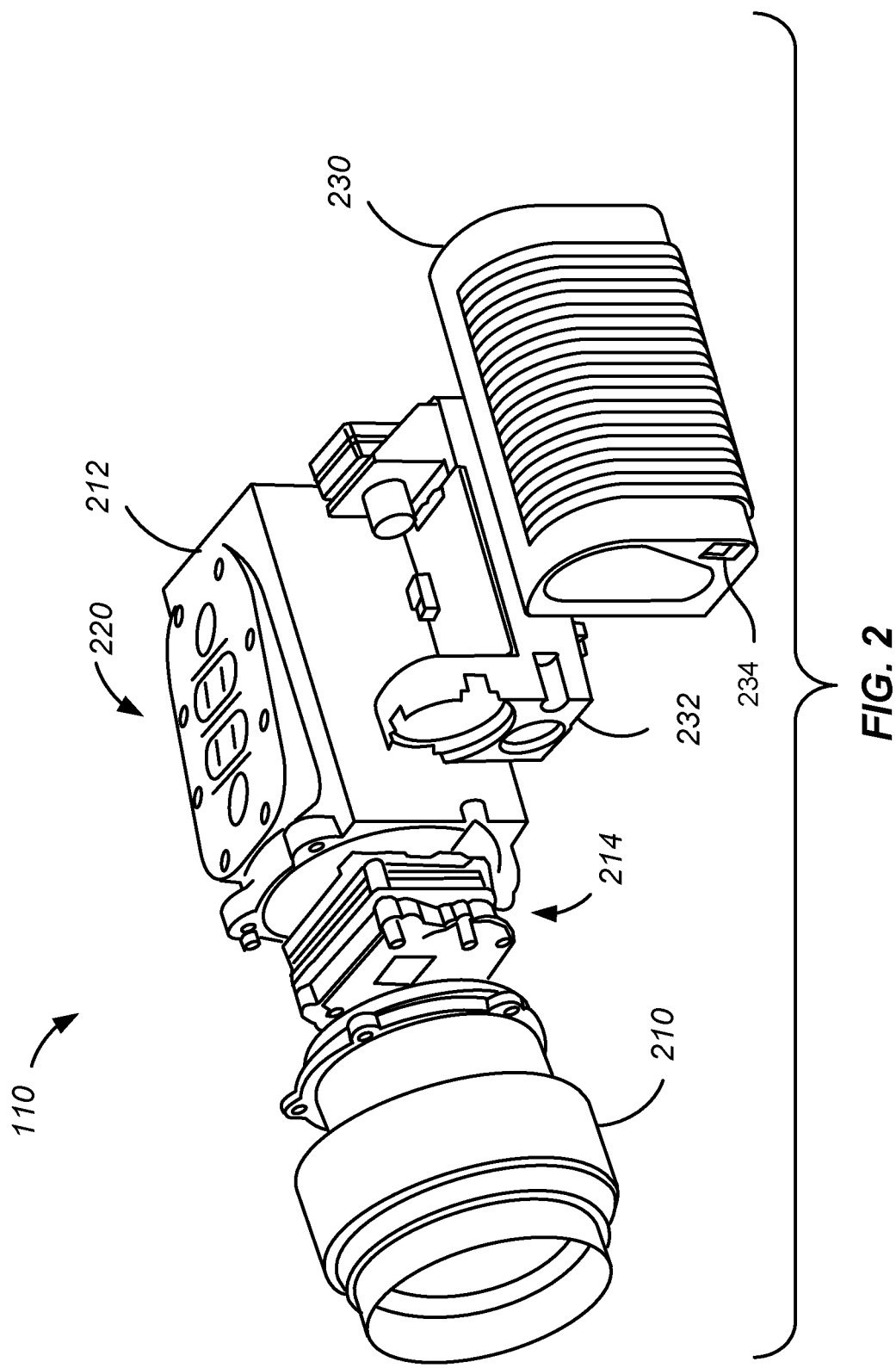
FIG. 2 is a simplified schematic diagram of an infrared/ranging module according to an embodiment of the present invention.

FIG. 2 is a simplified schematic diagram of an infrared/ranging module according to an embodiment of the present invention. The infrared/ranging module, which can also be referred to as a spotter scope and was illustrated by reference number 110 in FIG. 1, is utilized to obtain infrared images as well as perform ranging functions. The infrared/ranging module 110 includes an objective lens assembly, which collects and focuses incoming infrared radiation. The received infrared radiation is imaged using thermal imaging module 214, for example, an LWIR 1280×1024, 10 µm pixel resolution imager, which can be cooled or uncooled depending on the particular implementation. Electronics, including those discussed in relation to FIG. 1 are contained in housing 212 and keypad 220 is utilized to provide for control and operation of the infrared/ranging module. The keypad can be part of the I/O module discussed in relation to FIG. 1.

The laser range finder 232 is mounted in housing 230 and can be attached to the side of housing 212 to provide an integrated package. A visible camera 234 is provided in the embodiment illustrated in FIG. 2, which provides for visible images of the scene that is being surveyed using the laser range finder.

As shown in FIG. 1, the integrated optical system combines a thermal imager and a day scene color capable imager. These can be used as standalone image sources or can be fused. Using the integrated ballistic calculation and laser range finding technology illustrated in FIGS. 1 and 2, the infrared/ranging module can provide a firing solution and range to target in the INOD or can overlay a precision sniper rifle (PSR) scope as a disturbed reticle.

In an embodiment, the system includes a 10 µm, 1280×1024 uncooled detector. The integration of the UWB wireless link, RTA technology, and the uncooled detector provide an infrared/ranging module with increased target detection in comparison to conventional techniques. As described more fully below, using the wireless linkage to the Sniper, the system is able to provide a spatial alignment solution between Sniper and Spotter that guides the Sniper into the Spotter field of regard, then sends positive confirmation imagery to the Spotter.

Embodiments of the present invention provide an Integrated Remote Targeting and Sensing solution that enables precise target handoff and confirmation, spatial tracking and alignment of field of regards between Sniper and Spotter, a covert Ultra Wideband Wireless Connection, and Night Vision Spotter Capability with 2× FOV.

Figure 3:
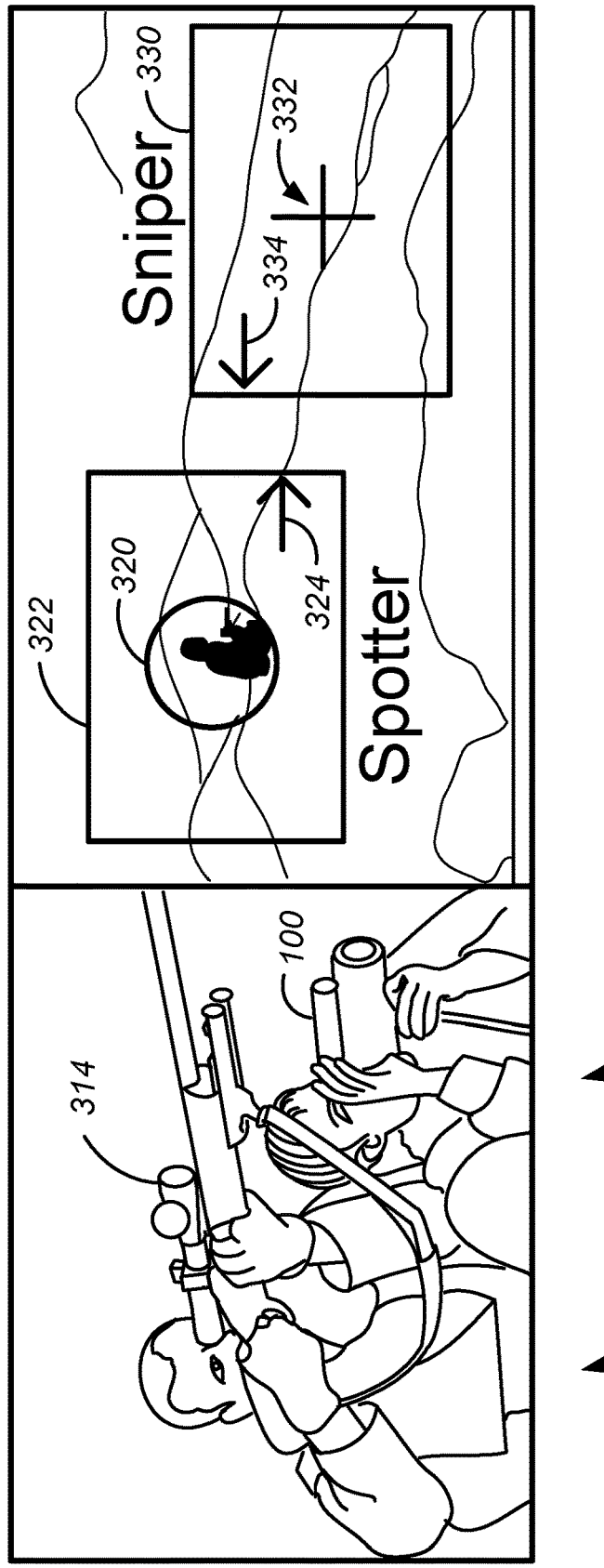
FIG. 3 is a diagram illustrating issues presented with spotter/sniper interaction.

FIG. 3 is a diagram illustrating issues presented with spotter/sniper interaction. This figure provides an exemplary use case for embodiments of the present invention. A user 310 utilizing the integrated optical system 100 and a second user 312 utilizing an optical system 314 are illustrated in FIG. 3. In a particular embodiment, the user 310 is a spotter, the second user 213 is a sniper using a modified rifle scope as optical system 314 (also referred to as a sniper scope) although embodiments of the present invention are applicable to two users attempting to image an object at a distance. Communication between the integrated optical system 100 and the optical system 314 is provided using the ultra-wide band wireless video link 134 and a corresponding wireless communication module (not shown) in the optical system 314.

As discussed above, the integrated optical system provides both color visible imagery via a standard spotter scope style image and a wider field of regard LWIR image for peripheral situational awareness that is 2× the field of view of the weapon sight. The wider field of view does not have to be 2× and other multiples are included within the scope of the present invention. In the embodiments illustrated herein, a multispectral sight can be utilized that provides days scene imagery and/or LWIR 1280×1024 imagery.

Referring to FIG. 3, the user 310 (e.g., the spotter) is able to mark a position (circle 320 in Spotter field of view 322) and pointers 324 and 334 are utilized to drive the fields of regard to match. In this illustration, the Sniper position (crosshairs 332 in Sniper field of view 330) is indicated as well as a pointer 334 to direct the Sniper to adjust the Sniper field of view 330 to the left to overlap with the Spotter field of view 322. Additionally, the Spotter field of view 322 is provided with a pointer 324 that indicates the position of the Sniper field of view to the right of the Spotter field of view. Thus, using wireless communications, both users are able to orient their optics to align some or all of their respective field of views.

Figure 4:
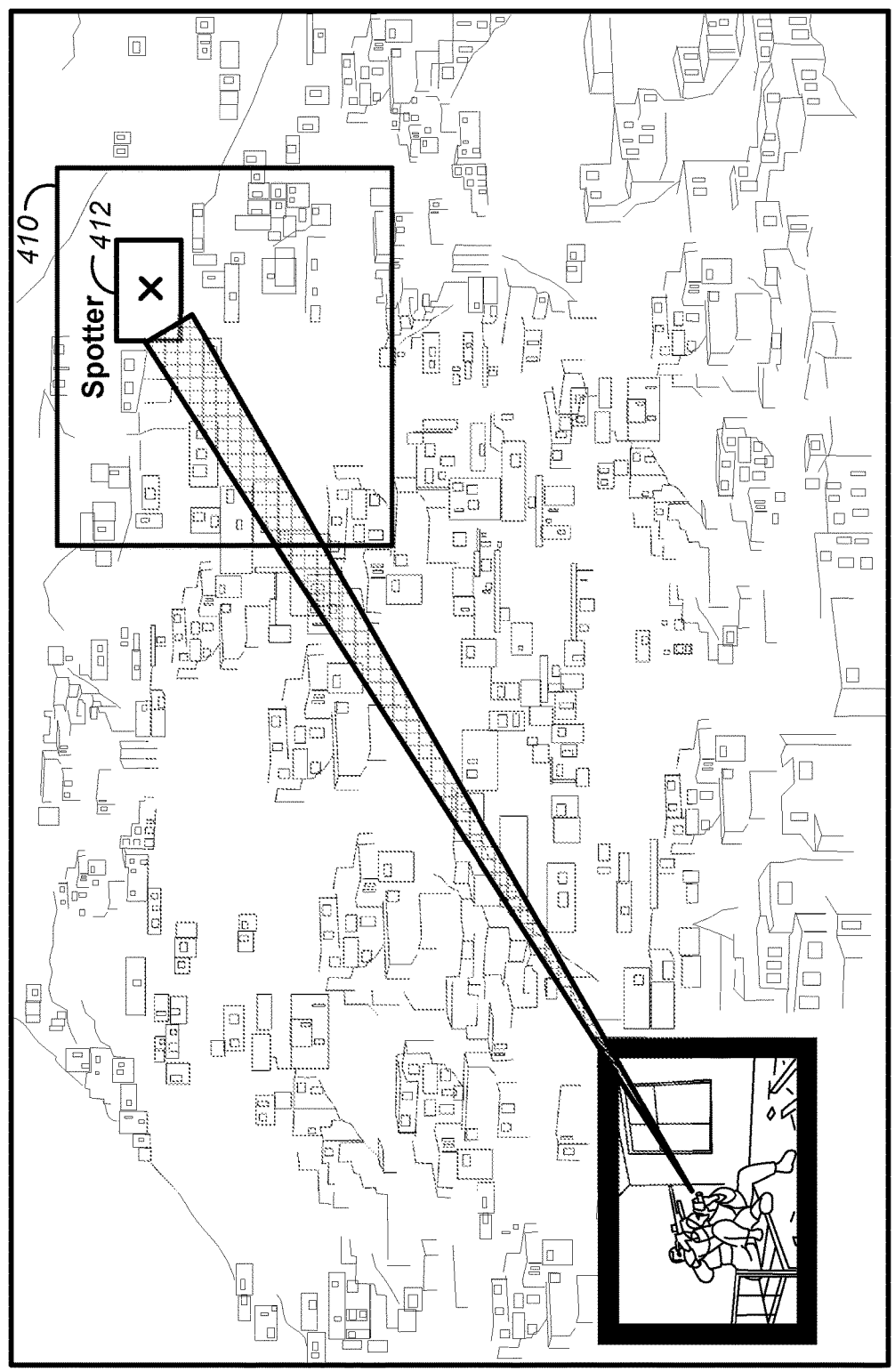
FIG. 4 is a diagram illustrating formation of an image stitched virtual sector according to an embodiment of the present invention.

FIG. 4 is a diagram illustrating formation of an image stitched virtual sector according to an embodiment of the present invention. As illustrated in FIG. 4, the spotter scans the integrated optical system across an area of observation, illustrated by the town in FIG. 4. As the field of view 412 of the integrated optical system is scanned across the area of observation, an image stitched virtual sector 410 is formed, which can also be referred to as a field of regard. During the formation of the image stitched virtual sector 410, the user is able to mark locations on the image stitched virtual sector, including target reference points, avenues of approach, points of interest, and the like.

Thus, using the fully stitched image of the viewable area, either optical system having a field of view in the viewable area, can be located in terms of determining the positions of the fields of view relative to the other system. Then, given this information, the two optical system can be guided such that their fields of view overlap at least partially. In some implementations in which the first optical system has a field of view that is wider than the field of view of the second optical system, the second optical system can be guided to position its field of view within the field of view of the first optical system.

Figure 5:
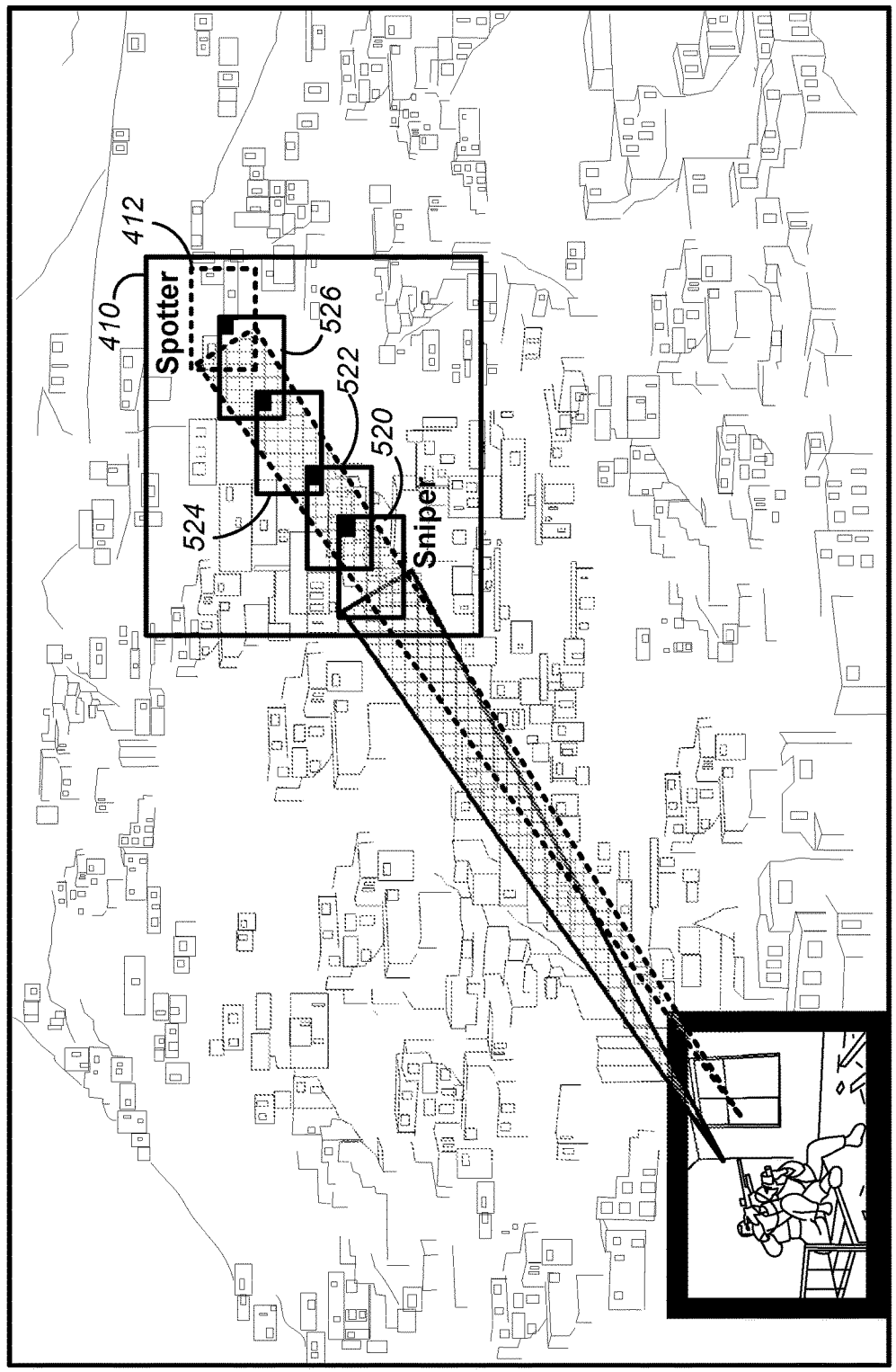
FIG. 5 is a diagram illustrating field of regard steering and confirmation according to an embodiment of the present invention.

FIG. 5 is a diagram illustrating field of regard steering and confirmation according to an embodiment of the present invention. In a defense-related application, the sniper/spotter team in the field is able to look down range and the spotter is able to help the sniper to find and view the target. In the embodiment illustrated in FIGS. 4 and 5, the spotter scans the area of observation, stitching together an image of the viewable sector 410 (also referred to as the field of regard), which can be saved as a dataset. The integrated optical system, also referred to as a spotter scope, is able to display the field of regard as well as markers, and the field of view of a second optical device as described herein. The spotter can mark points of interest (e.g., by pushing a button) as the field of regard is scanned. The spotter can mark avenues of egress or ingress, roads, targets of interest, areas of interest, or the like, thereby creating a map of marked targets and points of interest. These markers can be displayed in the field of regard in the integrated optical system for use by the user of the integrated optical system as well as the user of the second optical system. As an example, the field of regard including the markers can be displayed on a display of the integrated optical system.

As illustrated in FIG. 5, the sniper is then able to look down range, with a field of view initially positioned at field of view 520. The location of the field of view of the sniper 520 in the field of regard of the spotter 410 is determined and pointers or other suitable indicators are used in the display of the sniper to direct the field of view of the sniper to overlap with the field of view of the spotter as discussed in relation to FIG. 3, to direct the field of view of the sniper to particular points on interest in the field of regard, or the like. In FIG. 5, the sniper adjusts in order to cause the field of view to pass through several locations for the field of view: 520→522→524→526. As illustrated in FIG. 5, the current field of view of the sniper, 520 through 526 as time progresses, can be displayed on the spotter scope in real time as the sniper moves the field of view closer to the region of field of view 526.

Once the field of view of the sniper reaches the desired location in the field of regard, confirmation of the location can be provided to the spotter. As an example, the pointers or other indicators can change to indicate that the field of views have sufficient overlap. In some embodiments, the length or other characteristic of the pointer can change as the sniper field of view approaches the spotter field of view, providing an indication of the distance between the fields of view, with, for example, the length of the pointer decreasing as the distance between the fields of view decreases. In some embodiments, processing is performed in the spotter scope whereas in other embodiments, the processing is performed in the sniper scope, or shared between the units. One of ordinary skill in the art would recognize many variations, modifications, and alternatives.

The modified sniper scope is provided with the augmented map including the coordinates of the marked points of interest so that as the sniper scope scans the scene, the various points of interest are presented to the sniper, providing a situational awareness of points of interest in the scene. As an example, as the first optical system (e.g., the integrated optical system) identifies the points of interest in the scene, data regarding the points of interest are communicated to the optical system used by the second user (e.g., the modified sniper scope) and can be visually indicated in this optical system. Thus, if a point of egress is marked by the spotter, this point of egress is indicated to the sniper as the scene is scanned by the sniper.

Some embodiments use a direct day scope implementation and other embodiments use a day scope implementation with beam combined LWIR imagery or HD color day CMOS imager. Both provide distinct advantages. The spotter scope can be configured with LRF and Ballistic Calculation as modular add-on solutions that input data for presentation to the sniper.

Embodiments of the present invention provide a number of benefits not available using conventional systems. These benefits include a scope with an expanded situational awareness range, for instance, on the order of a field of view (FOV) of up to or greater than 9 degrees. Reductions in acquisition time are enabled by the spatial alignment guidance available using embodiments of the present invention. Since the spotter is able to view the image being viewed by the sniper, target confirmation is accomplished.

Figure 6:
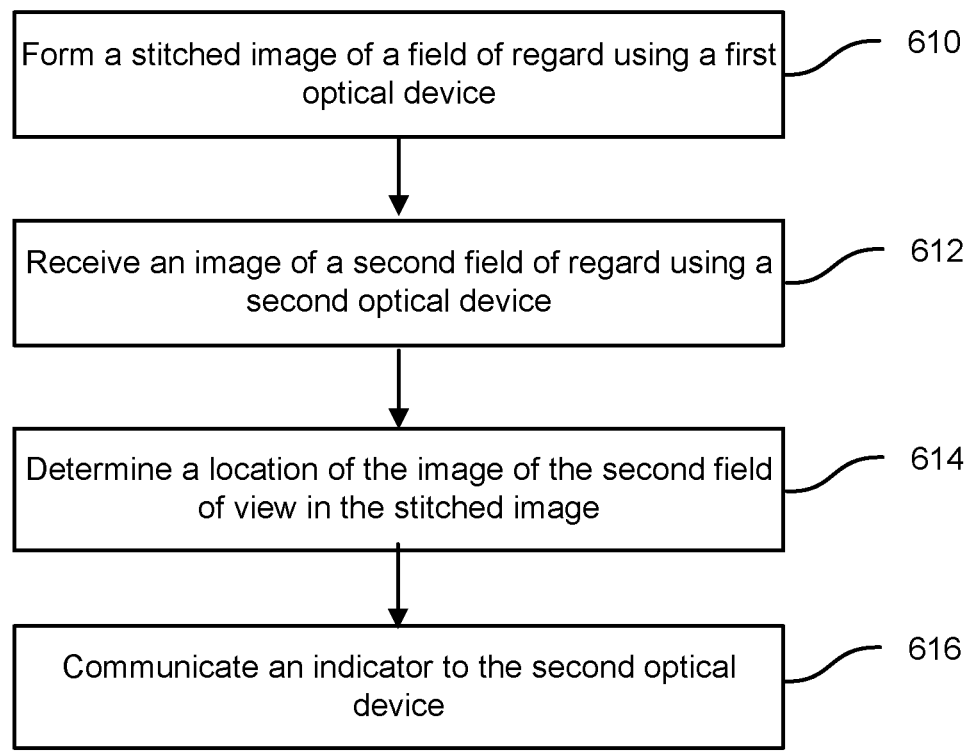
FIG. 6 is a simplified flowchart illustrating a method of operating an optical system according to an embodiment of the present invention.

FIG. 6 is a simplified flowchart illustrating a method of operating an optical system according to an embodiment of the present invention. The method 600 includes forming a stitched image of a field of regard using a first optical device. As an example, the first optical device can be a video imaging device. In a particular embodiment, the first optical system is either a spotter video system or a spotter still imaging system. The stitched image of the field of regard is formed using a plurality of sub-images associated with a first field of view.

The method also includes receiving an image of a second field of view from a second optical device. The second device can be a still imaging device. In the particular embodiment discussed above, the second optical system is either a sniper video system or a sniper still imaging system. In some embodiments, the first field of view is larger than the second field of view. The method further includes determining a location of the image of the second field of view in the stitched image. Determining a location of the image of the second field of view can include correlating the image of the second field of view with a portion of the stitched image. The method additionally includes communicating an indicator to the second optical device. The indicator is related to the location of the image of the second field of view in the stitched image.

In an embodiment, the method includes updating the indicator as a separation between the second field of view and the first field of view decreases. As an example, the method can include receiving additional images of the second field of view and updating the indicator to direct the second optical system to overlap the second field of view with the first field of view.

It should be appreciated that the specific steps illustrated in FIG. 6 provide a particular method of operating an optical system according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
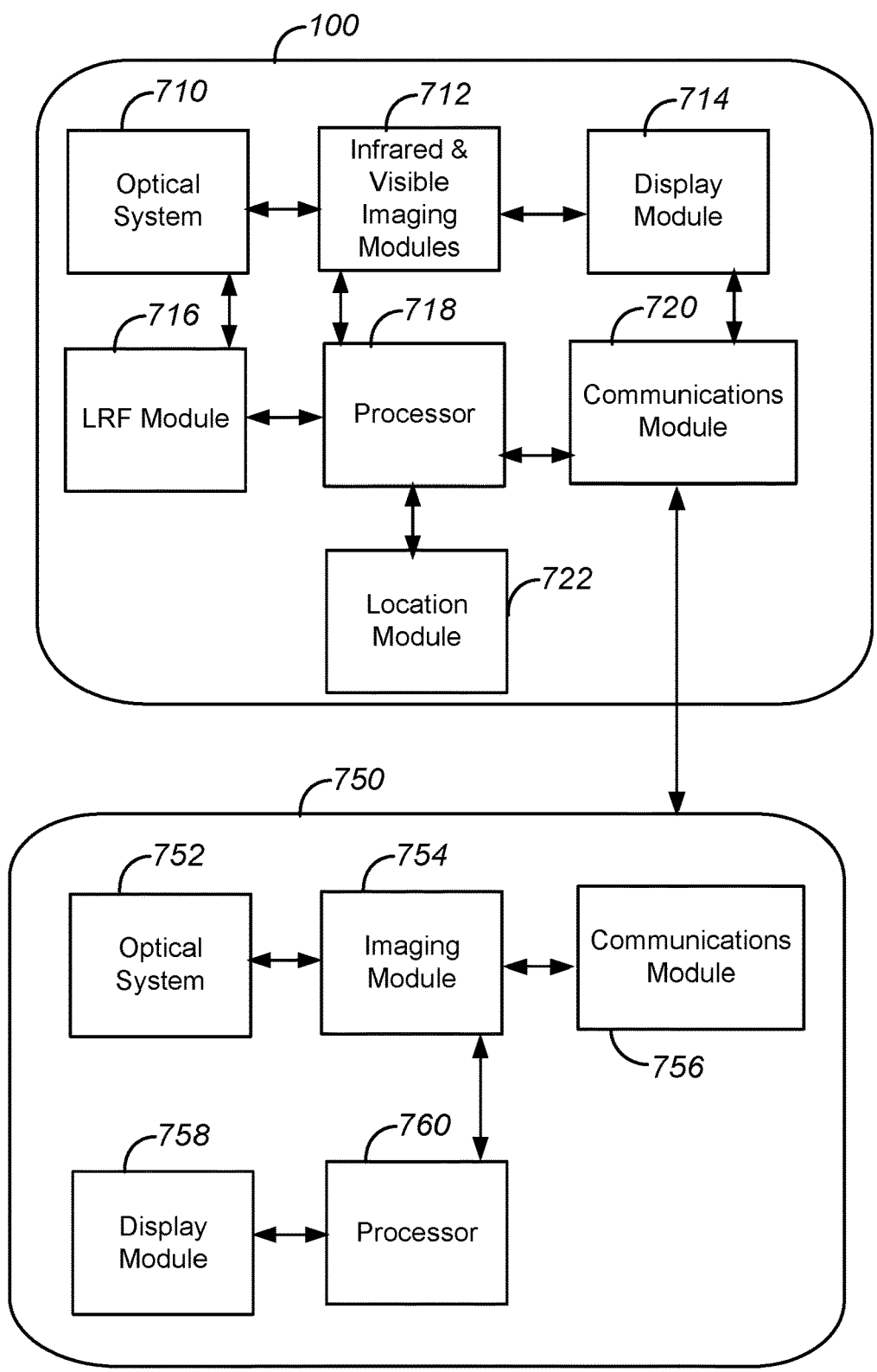
FIG. 7 is a simplified schematic diagram illustrating a set of optical devices according to an embodiment of the present invention.

FIG. 7 is a simplified schematic diagram illustrating a set of optical devices according to an embodiment of the present invention. The set of optical devices include an integrated optical device 100 that includes several components. Additional description related to the integrated optical device is provided in relation to FIGS. 1 and 2. The integrated optical device 100 includes an optical system 710, which can include optical elements useful for imaging at visible and/or infrared wavelengths, and an infrared and visible imaging modules (712). In some embodiments, the infrared and visible imaging modules can share common optical elements and processing capability. In other embodiments, separate optical elements and processing capability are utilized depending on the particular application. One of ordinary skill in the art would recognize many variations, modifications, and alternatives.

The integrated optical device also includes a laser range finding (LRF) module 716 that can be utilized to determine the distance to a particular target of interest. The system can use the distance provided by the LRF in computing ballistics, other system computations, and the like. In some embodiments, the distance to target can be provided to the second optical system using the wireless communications link described herein. A location module 722 is provided that can be utilized to determine the location of the integrated optical device (e.g., a GPS location determination module) as well as movement of the integrated optical device with respect to a reference frame. As the device is moved, the motion of the field of view can be used in forming a stitched scene of the field of regard, although other methods to form the stitched scene can also be used. Additionally, the motion of the field of view can be computed and provided to a second optical device to provide inputs for the second device as described herein.

A display module is provided to display images collected in either the visible or infrared regions. In some cases, the visible and infrared images can be overlaid using the display module. Processor 718 interacts with the various system elements to provide the functionality described herein.

A communications module 720 is provided that interacts with a matching communications module 756 in the second optical device 750. The communications modules, which typically utilize wireless communications protocols, enable images, data about images, portions of images, indicators used to align the fields of view of the devices, and the like to be transferred between the integrated optical device 110 and the second optical device 750.

The second optical device 750 includes an optical system 752 and one or more imaging modules 754, which can include visible imaging, infrared imaging, combinations thereof, or the like. A processor interacts with the various system elements to provide the functionality described herein. A display module 758 is provided to enable the user to view images obtained using the optical system working in conjunction with the imaging module(s).

Using the first optical system (i.e., the integrated optical system), a first user can create a stitched image of a field of regard using a plurality of sub-images defined by a first field of view, which is smaller than the field of regard. Preferably, the field of regard will include the area of interest that the first user wants the second user to image. In forming the stitched image, motion of the first optical system can be measured and used to stitch together the image from sub-images collected at the first field of view.

The user of the second optical system (i.e., the second user) is able to image a portion of the field of regard, using the optical system with the second field of view. By communicating information between the optical devices, the images from the second optical system can be correlated with the stitched image of the field of regard, enabling the users to determine the position of their respective images relative to each other. Thus, embodiments of the present invention provide a digitally correlated system in which the second optical system can receive indicators that enable the alignment between the second field of view and the first field of view.

Some embodiments have been described in terms of the first optical device processing imagery and sending information to the second optical device to enable the second optical device to align to the first optical device. As an example, video or still images could be transmitted from the second optical system to the first optical system. The first optical system would utilize the video or still images to correlate the fields of view and send back coordinates for locations of marked items.

Figure 8:
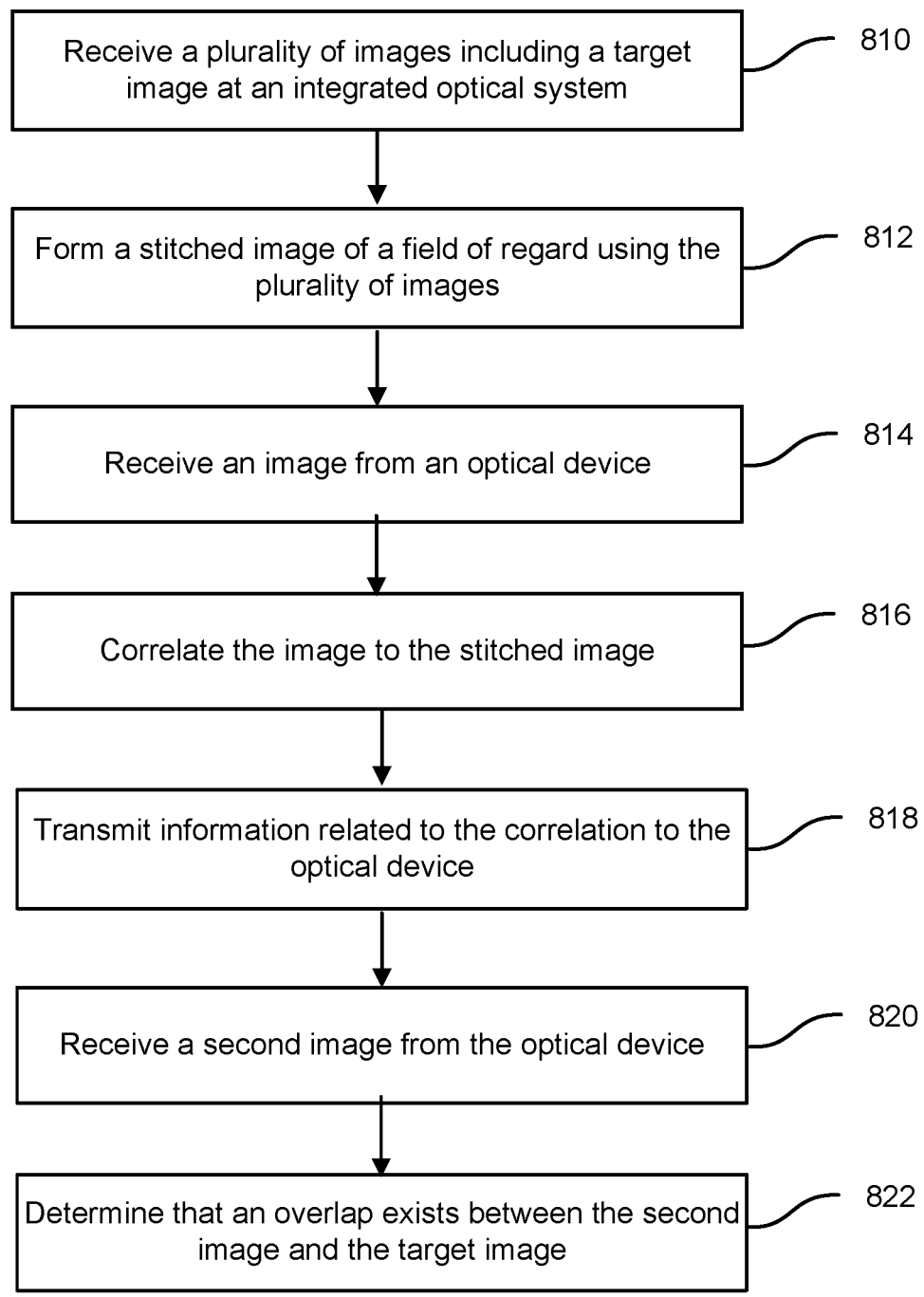
FIG. 8 is a simplified flowchart illustrating a method of aligning an optical device according to an embodiment of the present invention.

FIG. 8 is a simplified flowchart illustrating a method of aligning an optical device according to an embodiment of the present invention. The method 800 includes receiving a plurality of images (e.g., infrared images) at an integrated optical system (810). Each of the plurality of images is disposed in a field of regard and can be characterized by a first field of view. One of the plurality of images comprises a target image. The method also includes forming a stitched image of the field of regard using the plurality of images (812). The stitched image includes the target image. The method further includes receiving, at the integrated optical device, from the optical device, an image (e.g., an infrared image) defined by a second field of view (814) and correlating the image to the stitched image (816). The image from the optical device can have a differing field of view from the first field of view and can, therefore, have a larger field of view, smaller field of view, or the same field of view.

The method additionally includes transmitting information related to the correlation to the optical device (818), receiving, at the integrated optical device, from the optical device, a second image (e.g., an infrared image) defined by the second field of view (820), and determining that at least a portion of the second image overlaps with at least a portion of the target image (822). The user of the integrated optical device can mark, in the stitched image, one or more locations associated with one or more objects, such as an ingress route, an egress route, buildings, roads, or the like. In some implementations, the method includes transmitting information related to the one or more marked locations to the optical device. As examples, the one or more marked locations can be points of interest and the information can include coordinates, markers to be displayed in the display of the second optical device, distances to other elements in the field of regard, or the like. Accordingly, in some embodiments, the second optical device is able to display markers that were defined in the field of regard using the first optical device.

It should be appreciated that the specific steps illustrated in FIG. 8 provide a particular method of aligning an optical device according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
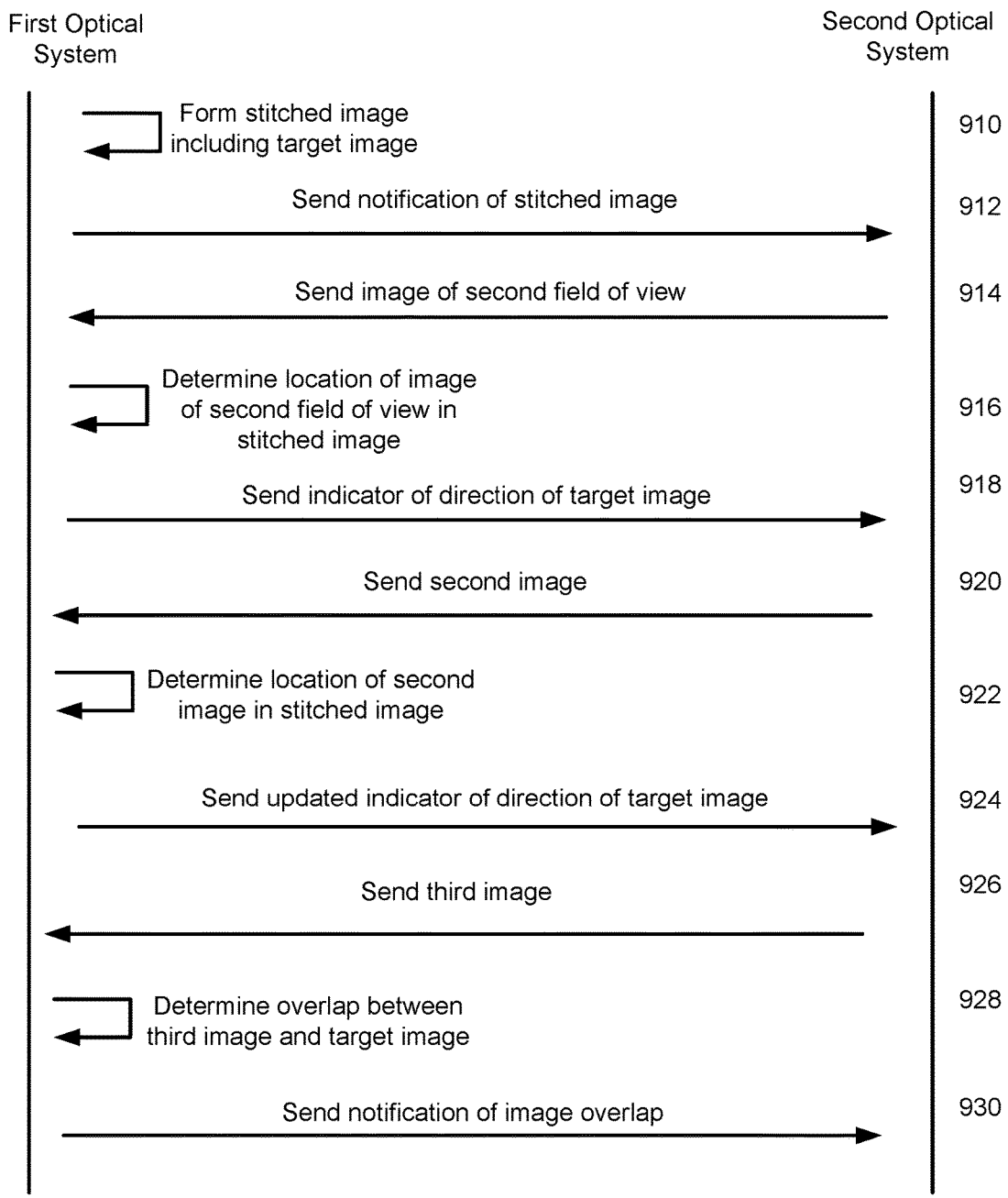
FIG. 9 is a sequence diagram illustrating data flow between the first and second optical devices according to an embodiment of the present invention.

FIG. 9 is a sequence diagram illustrating data flow between the first and second optical devices according to an embodiment of the present invention. Although FIG. 9 illustrates multiple steps in the sequence of communications and actions, not all of the illustrated steps are required and some may be optional in various embodiments. The sequence includes the first optical system (e.g., the integrated optical system), forming a stitched image of a field of regard that includes a target image (910). The stitched image of the field of regard can be formed using a plurality of sub-images associated with a first field of view. In some embodiments, the first optical device provides the capability to mark, in the stitched image, for example, in the target image, one or more locations associated with one or more objects. These objects can include an ingress route, an egress route, buildings, roads, or the like. In some embodiments, the marked object can be used in place of the target image in the description that follows as the second optical device is provided with indicators that can be used to direct the second optical device to image the marked object. In these embodiments, the sequence can also include transmitting information from the first optical device to the second optical device related to the one or more marked locations. After formation of the stitched image, a notification of the stitched image can be sent to the second optical system (912). In some implementations, this notification is optional. It should be noted that although some of the imaging processing processes (e.g., steps 910 and 916) are illustrated as being performed by the first optical device, one or more of these image processing steps can be performed by the second optical device. One of ordinary skill in the art would recognize many variations, modifications, and alternatives.

The second optical system (e.g., the sniper scope) can send an image that is captured for a second field of view (914). In some implementations, the second field of view is smaller than the first field of view, but this is not required by the present invention. In some implementations, the second field of view can be sent to the first optical device prior to or during the formation of the stitched image. Using the stitched image of the field of regard and the image from the second optical device, the location of the image from the second optical device in the stitched image can be determined (916), for example, by correlating the image from the second optical device with a portion of the stitched image. Methods for determining the location are described herein. Given the location of the image from the second optical device in the stitched image, the position of the image from the second optical device with respect to the target image can be determined. Once the position is determined, an indicator can be generated and sent to the second optical device that indicates the direction the second optical device needs to move its field of view in order to begin imaging at locations closer to the target image (918).

Using the indicator, the second optical device is repositioned as the field of view of the second optical device is scanned towards the target image. A second image is obtained by the second optical device and sent to the first optical device (920). The location of the second image in the stitched image is then determined (922). As the field of view of the second optical device draws closer to the target image, an updated indicator of the direction of the target device is sent to the second optical system (924). In some cases, as the separation between the second field of view and the target image decreases, the length, width, or other characteristics of the indicator can be changed to show the decrease in separation. One of ordinary skill in the art would recognize many variations, modifications, and alternatives.

A third image collected by the second optical device can be sent to the first optical device (926). Using the third image, the determination can be made that overlap exists between the third image and the target image (928). Accordingly, a notification of the image overlap can be provided to the second optical device as an indication that the second field of view and the target image overlap to some extent (930). In cases where the second field of view is smaller than the first field of view associated with the target image, complete overlap of the second field of view within the first field of view can be accomplished.

The first and second optical devices can be still imaging devices, video imaging devices, or combinations thereof. As an example, video detectors operating in the infrared and still image detectors operating in the visible can be combined in an optical device.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A set of cooperative optical systems comprising:
    an integrated optical system comprising:
        an infrared imaging system including an infrared detector operable to generate a plurality of sub-images associated with a first field of view;
        a first display module;
        a first wireless communications module operable to receive an image of a second field of view from a second optical device; and
        a processor coupled to the infrared imaging system and operable to:
            form a stitched image of a field of regard comprising the plurality of sub-images;
            designate a sub-image of the first field of view as a target field of view located at a target location in the stitched image;
            determine a location of the image of the second field of view in the stitched image;
            define a directional indicator that indicates a direction from the second field of view to the target field of view;
            progressively display, in real time, on the first display module, the second field of view within the stitched image as a second optical device in a second optical system is moved according to the directional indicator,
        wherein
    the second optical system further comprises:
        a second wireless communications module operable to transmit an image to the first wireless communications module.

2. The set of cooperative optical systems of claim 1 wherein the first display module is operable to overlay the stitched image with the second field of view of the second optical system.

3. The set of cooperative optical systems of claim 1, further comprising a second display module, wherein the second display module is operable to display an indicator including location information.

4. The set of cooperative optical systems of claim 1, further comprising a laser range module operable to determine when a new frame of data is to be captured and to cause the processor to create an additional stitched image.

5. The set of cooperative optical systems of claim 1, further comprising a location module operable to determine (i) a location of the integrated optical system or (ii) that the integrated optical system is moving.

6. A method of aligning an integrated optical system, the method comprising:
    receiving a plurality of images at an integrated optical system, wherein each of the plurality of images is disposed in a field of regard, wherein one of the plurality of images comprises a target image;
    forming a stitched image of the field of regard using the plurality of images, wherein the stitched image includes the target image;
    receiving, at the integrated optical system, from an optical device, an image defined by a second field of view;
    correlating the image to the stitched image;
    transmitting information related to the correlation to the optical device;
    receiving, at the integrated optical system, a second image defined by the second field of view;
    determining that at least a portion of the second image overlaps with at least a portion of the target image; and
    progressively displaying, in real time, on a display, the second image within the stitched image as the optical device is moved according to a directional indicator, wherein the directional indicator indicates a direction from the second field of view to the target image.

7. The method of claim 6 wherein the plurality of images are infrared images, the image defined by the second field of view is an infrared image, and the second image is an infrared image.

8. The method of claim 6 wherein the plurality of images are defined by a first field of view.

9. The method of claim 8 wherein the first field of view is larger than the second field of view.

10. The method of claim 6 further comprising marking, in the stitched image, one or more locations associated with one or more objects.

11. The method of claim 10 wherein the one or more locations indicate at least one of an ingress route, an egress route, a building, or a road.

12. The method of claim 10 further comprising transmitting information related to the one or more marked locations to the optical device.

\* \* \* \* \*